(12) United States Patent
Galle, Sr.

(10) Patent No.: US 7,328,520 B2
(45) Date of Patent: Feb. 12, 2008

(54) GAGE FOR MEASURING DIAMETERS

(75) Inventor: Edward M. Galle, Sr., Friendswood, TX (US)

(73) Assignee: The Technologies Alliance, Inc., Houston, TX (US)

( * ) Notice: Subject to any disclaimer, the term of this patent is extended or adjusted under 35 U.S.C. 154(b) by 109 days.

(21) Appl. No.: 11/156,200

(22) Filed: Jun. 17, 2005

(65) Prior Publication Data

US 2006/0283037 A1 Dec. 21, 2006

(51) Int. Cl.
*G01B 5/00* (2006.01)
(52) U.S. Cl. .......................................... 33/783; 33/812
(58) Field of Classification Search .......... 33/783–784, 33/791–795, 797, 806–808, 810–812, 817
See application file for complete search history.

(56) References Cited

U.S. PATENT DOCUMENTS

| | | | | |
|---|---|---|---|---|
| 2,668,359 | A | * | 2/1954 | Litchfield ..................... 33/810 |
| 3,145,475 | A | * | 8/1964 | Alford ......................... 33/41.1 |
| 4,189,843 | A | * | 2/1980 | Baldwin ..................... 33/199 R |
| 4,524,524 | A | * | 6/1985 | Frank et al. ................... 33/701 |
| 4,700,484 | A |   | 10/1987 | Frank et al. |
| 4,972,603 | A | * | 11/1990 | Meyer .......................... 33/810 |
| 5,020,230 | A |   | 6/1991 | Greenslade |
| 5,182,862 | A |   | 2/1993 | Frank et al. |
| 6,145,207 | A |   | 11/2000 | Brunson |

OTHER PUBLICATIONS

*API and Premium Gages*, from Gagemaker, P.O. Box 87709, Houston, TX 77287-7709, two pages (15-16).

* cited by examiner

*Primary Examiner*—Yaritza Guadalupe-McCall
(74) *Attorney, Agent, or Firm*—Bracewell & Giuliani LLP

(57) ABSTRACT

A gage for measuring a diameter of a workpiece has a pair of parallel spaced apart side rails. A pair of block sets is mounted between the side rails and spaced apart from each other. A pair of arms extends transverse to the rails through mating profiles in the blocks of each block set. The arms are slidable in a transverse direction to the side rails. Each block set can slide along the side rails and has a single fastener that secures the blocks to the side rails and the arms to the blocks in a desired position. Drag brakes between the blocks and the side rails prevent the components from sliding of their own weight while the fasteners are loosened. The block sets and arms are rotatable 180 degrees about the fasteners when loosened to accommodate outside and inside measurements.

20 Claims, 5 Drawing Sheets

GAGE FOR MEASURING DIAMETERS

FIELD OF THE INVENTION

This invention relates in general to measuring gages, and in particular to a gage for measuring thread diameters, seal diameters, and other tapered and cylindrical diameters.

DESCRIPTION OF THE PRIOR ART

Precision machined parts must be carefully measured to assure that tolerances are met in order for the part to function properly. For example, threaded connectors for offshore oilfield production risers must be machined to close tolerances. For test and qualification purposes even closer tolerances are required. These connectors require accurate measurements at the threads, seal recesses and inner and outer diameters.

A typical measuring gage for these purposes has a frame with two spaced-apart arms mounted to blocks that slide on the frame. The arms slide relative to the blocks in directions transverse to the frame. Probes are mounted to the lower ends of the arms for engaging opposite sides of the work piece. Present measuring gages of this type have a large number of locking or clamping screws that must be adjusted to precisely locate the gage frame elements and lock them into a rigid assembly. Each locking screw must be properly tightened to insure a tight and rigid connection that will not flex or move during use of the gages.

In use, precision gage blocks of a known thickness or length are stacked together to determine the reach or distance from a reference surface or plane located on the blocks to the probes attached to the lower ends of the arms. Also, precision gage blocks are used to precisely adjust the distance between the probes. These precision gage blocks and the gage frame elements must both be positioned and held manually by the technician as the locking screws are tightened to lock the gage frame elements. This operation requires a great deal of skill and multiple attempts in order to obtain the required accuracy during setup of the gage.

In some cases, rather than using gage blocks, a setting standard, which is a precisely manufactured cross-section of the work piece, is used. A setting standard facilitates the setting of the gage in that only the frame elements of the gage must be held manually in precise proper positions when the locking or clamping screws are tightened. Although a setting standard does facilitate the setup of a gage, skill is still required of the technician, and the cost of a setting standard is expensive.

Because of the large number of locking screws, it is essentially impossible to make such a gage absolutely rigid, which results in reduced accuracy of the measurement being made. Present gage designs often use cylindrical rods for the arms and/or frame, which tend to deflect more than desired under load. The technician or machinist must apply loads to the gage in order to hold the probes in contact with the part, and this can result in measuring errors as the gage frame and arms flex.

Many prior art gages rely on thumb screws for locking. However, thumb screws are limited in the amount of torque that can be applied. Other designs use socket head set screws, which allow higher torques to be applied. However socket head set screws require the use of a number of different sizes and configuration of Allen wrenches.

A tedious and time-consuming effort is required to switch a gage assembled for measuring outside thread and seal diameters to a configuration for measuring inside thread or seal diameters. The gage has to be taken apart and the sliding blocks reversed on the side rails. This process requires loosening multiple locking screws, removing the blocks entirely from the side rails, properly repositioning the parts, and retightening all the locking screws. The time required to convert such a gage is costly. Often, a machine shop will acquire additional gage assemblies in order to reduce the number of times and cost of resetting a gage from inside to outside measurement configuration.

SUMMARY OF THE INVENTION

The gage of this invention has first and second block sets mounted to the side rails. Each block set comprises two juxtaposed blocks. The first block set is selectively movable along the side rails toward and away from the second block set. An arm having a measuring probe is mounted between the blocks of each of the block sets. Each of the arms is selectively movable in a direction parallel to its length and transverse to the side rails. A releasable single large locking fastener or rod secures the blocks of the block sets tightly together against the arm and to the side rails.

Preferably drag brakes are mounted in each of the blocks comprising a block set. The drag brakes react against the side rails and bias the juxtaposed blocks toward each other, retarding movement of the arm and block set when the locking fastener is loosened. Each of the block sets is preferably rotatable 180 degrees around the axis of the locking fastener and relative to the side rails without removing its arm or removing the block set from the side rails. This allows the arms and reference planes on the blocks to be rotated from an inside diameter measuring position to an outside diameter measuring position.

To minimize deflection, the arms are I-Beam shaped bars, each having a width greater than a thickness. The arm width extends in a direction parallel to the length of the rails toward the other of the arms. Similarly, the side rails may have a generally rectangular or C-Beam configuration with the width being parallel to the length of the arms.

One of the probes comprises a dial indicator for indicating the difference between the specified dimension and the actual measurement. The other probe comprises a contact mounted to a vernier threaded member for precise distance adjustment between probes. Recesses in the block sets allow the indicator probes to be positioned in close proximity to the bottom or reference plane of the block sets for measuring diameters near the end of the workpiece. Preferably an elastomeric or plastic layer is placed on portions of the side rail to serve as a thermal barrier against operator contact. The elastomeric or plastic layer has a low heat transfer coefficient to avoid warmth of the operator's hands from heating the side rails, which could result in differences in measurement.

DETAILED DESCRIPTION OF THE INVENTION

Figure 1:
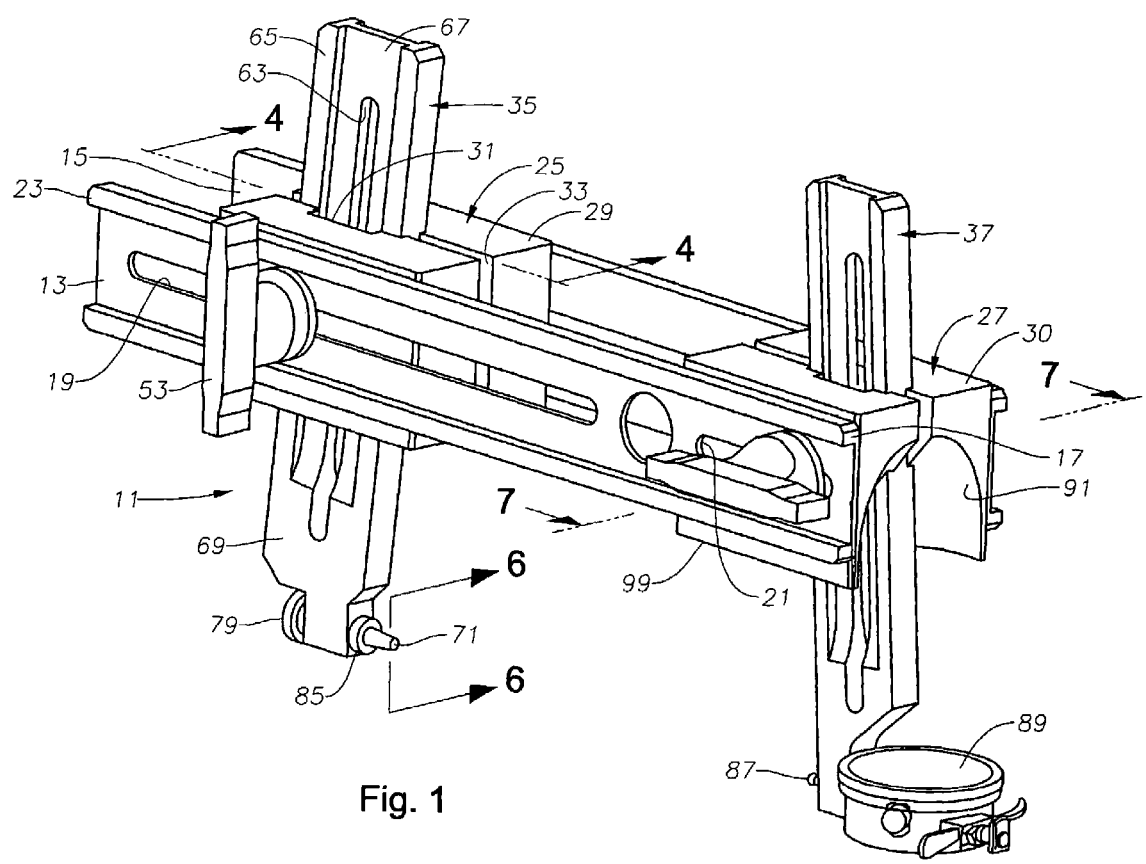
FIG. 1 is a perspective view of a gage constructed in accordance with this invention, with the probes arranged for measuring an outer diameter surface.
Figure 5:
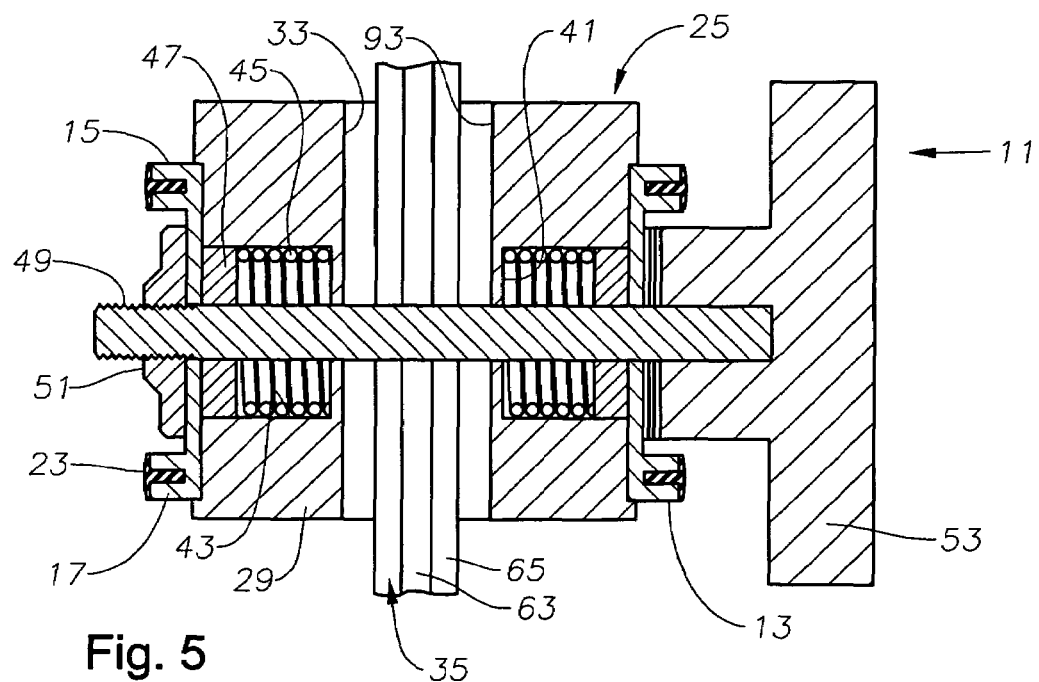
FIG. 5 is a sectional view of the gage of FIG. 1, taken along the line 5-5 of FIG. 4.
Figure 7:
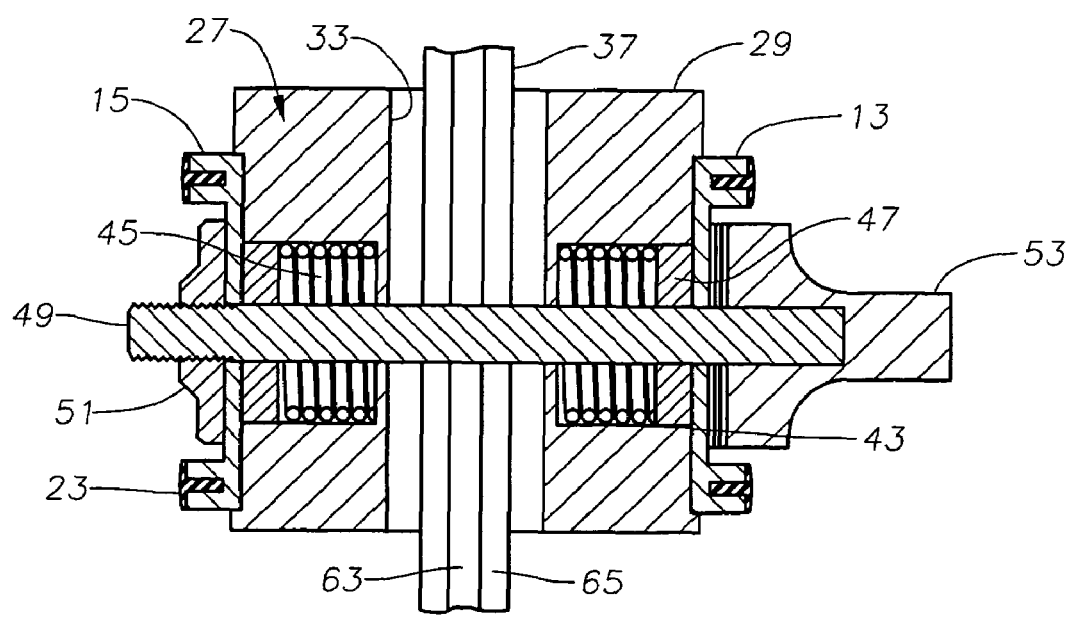
FIG. 7 is a sectional view of the gage of FIG. 1, taken along the line 7-7 of FIG. 1.

Referring to FIG. 1, gage 11 has a pair of side rails 13, 15, preferably formed of metal, such as steel. Side rails 13, 15 are mirror images of each other, parallel to each other, and spaced apart from each other. Each side rail 13, 15 is a generally flat rectangular bar with flanges 17 at its upper and lower edges. In cross section as shown in FIGS. 5 and 7, each side rail 13, 15 are in the form of a C-Beam. Each side rail 13, 15 has a width measured from the upper side of one flange 17 to the lower side of its other flange 17 that is greater than its thickness. When gage 11 is oriented as shown in FIG. 1, the width is in a vertical plane.

Each side rail 13, 15 have a pair of adjusting slots 19, 21. Slots 19, 21 are elongated holes or slots that extend parallel to the length or longitudinal axis of each side rail 13, 15. In this embodiment, slot 19 has a much greater length than slot 21 although they could be the same length. Alternately, slots 19, 21 could be a series of circular holes rather than an elongated hole, if desired, but much of the adjustability would be diminished. A thermal barrier layer 23 is preferably placed on each flange 17. Layer 23 is formed of elastomeric or plastic material with a low heat transfer coefficient. Many different materials are suitable. Layer 23 allows an operator to grasp flanges 17 without the warmth from the operator's hand transferring to the metal of side rails 13, 15, which could affect the measurement due to thermal elongation of the side rails.

Figure 4:
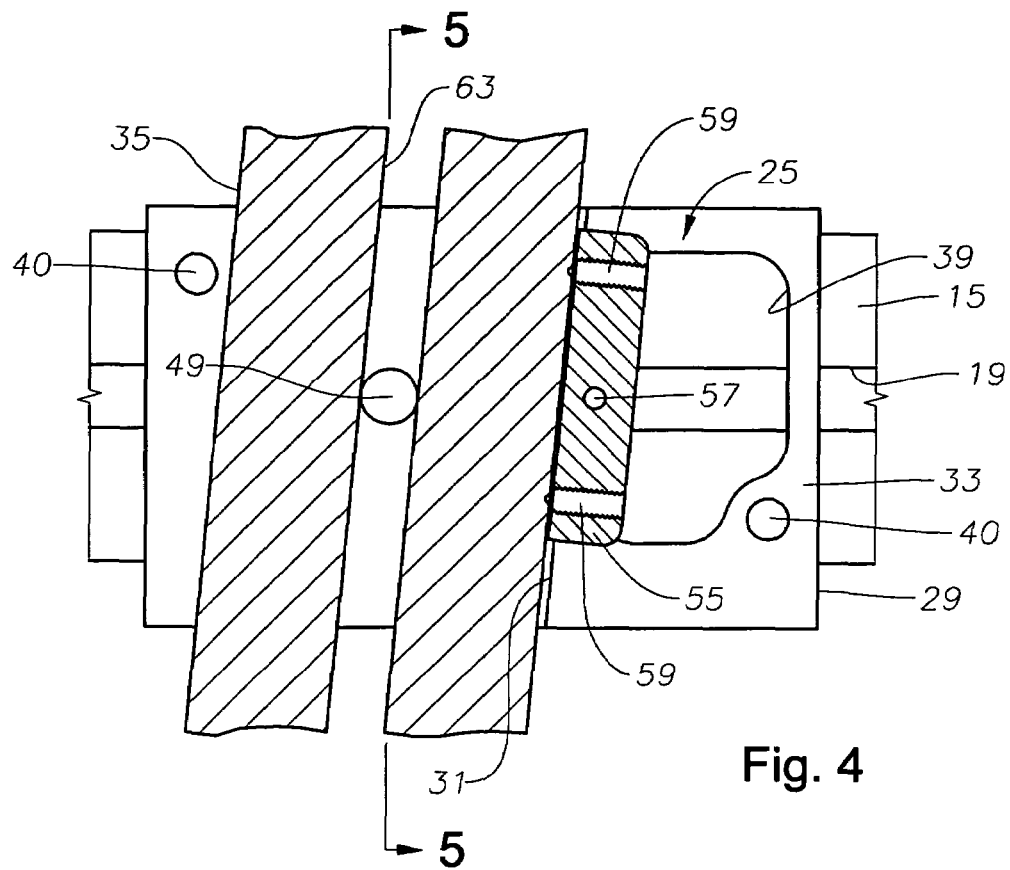
FIG. 4 is a sectional view of the gage of FIG. 1, taken along the line 4-4 of FIG. 1.

First and second block sets 25, 27 are clamped between side rails 13, 15. Each block set 25, 27 comprises a pair of juxtaposed blocks 29, 30 respectively. The blocks 29, 30 of each block set 25, 27 are mirror images of each other. Each block 29, 30 has a grooved profile 31 on its inner side 33. Profiles 31 mate with each other to define receptacles for receiving reach arms 35, 37. Profiles 31 thus partially match the contour of arms 35, 37. Referring to FIG. 4, a hole 39 may be formed in each block 29 for weight reduction. Dowel pins 40 are placed at corners of mating blocks 29 diagonally from each other. Pins 40 may or may not be affixed to one of the blocks 29 and slide freely in a mating hole in the other block 29 to maintain blocks 29 in alignment with each other while loosened.

Referring to FIG. 5, a passage extends transversely through blocks 29 perpendicular to arm 35. A counterbore 43 is formed in each passage, resulting in a shoulder base 41 at inner surface 33. A coil spring 45 is located in each counterbore 43. Coil spring 45 is biased against a friction disk or brake 47, which in turn is biased against the inside surface of one of the side rails 13, 15.

A tension or locking rod 49 extends through counterbores 43, coil springs 45, friction disks 47, arm 35 and side rails 13, 15. Locking rod 49 on one end has a nut 51 rotatably constrained by the slot in side rail 15. A large knob 53 for gripping by a user's hand is secured to the opposite end of locking rod 49. Rotating knob 53 draws blocks 29 toward each other for clamping arm 35 in a fixed position and clamping first block set 25 in a fixed position. Loosening knob 53 of locking rod 49 allows one to slide block set 25 relative to rails 13, 15. However, even though loosened, coil springs 45 maintain a frictional or drag force to retard the movement of the block set and the arm. The drag force is preferably sufficient so that even if an operator turns side rails 13, 15 vertically with knob 53 loosened, the weight of block set 25 would not be sufficient to overcome the friction of friction disk 47. Coil springs 45 also exert a bias force against arm 35 to prevent it from sliding from its own weight when locking rod 49 is loosened.

Figure 3:
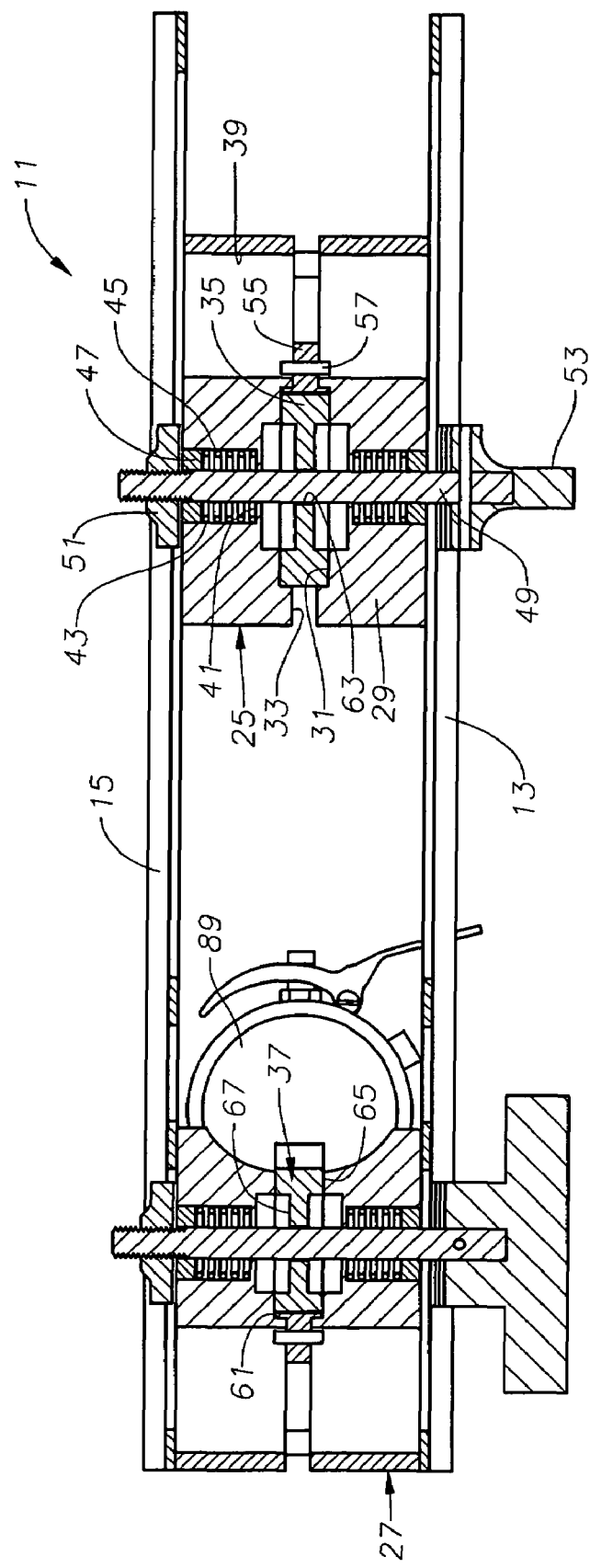
FIG. 3 is a sectional view of the gage of FIG. 1, taken along the line 3-3 of FIG. 2.

A stabilizing member 55 is utilized for maintaining arm 35 in alignment with profile 31 while locking rod 49 (FIG. 5) is loosened. As shown in FIG. 4, stabilizing member 55 is located on one side of arm 35. Stabilizing member 55 is mounted between the juxtaposed blocks by a pin 57 that engages a groove in blocks 29. Stabilizing member 55 has a pair of spring members 59 that are urged against one edge of arm 35, pushing arm 35 against the opposite edge of profile 31. As shown in FIG. 3, stabilizing member 55 has a flange 61 that engages a mating surface formed in inner sides 33 of blocks 29.

As shown in FIG. 7, second block set 27 has a similar structure to first block set 25, including locking rod 49, drag brake disc 47, and stabilizing member 55 as shown in (FIG. 3).

Referring to FIG. 1, each arm 35, 37 has an elongated slot 63 that extends parallel to the length of each arm 35, 37. Locking rod 49 (FIG. 3) passes through slot 63. Slot 63 defines the upper and lower limits of travel of arms 35 and 37. In the embodiment shown, profiles 31 are formed such that arms 35, 37 are not perpendicular to side rails 13, 15, rather are slightly inclined from being perpendicular. Each arm 35, 37 is generally rectangular, and has a transverse cross-section over part of its length in the shape of an I-beam. In the I-beam portion, flanges 65 are located on opposite side edges and a web 67 connects flanges 65. Flanges 65 and web 67 extend completely to the upper end of each arm 35, 37, as shown in FIG. 1. Flanges 65 and web 67 terminate above the lower end, resulting in enlarged thickness section 69. The width of each arm 35, 37 between opposite edges of flanges 65 are much greater than its thickness measured at section 69. The width of each arm 35, 37 are in a common plane that is parallel to planes containing the widths of side rails 13, 15.

Figure 6:
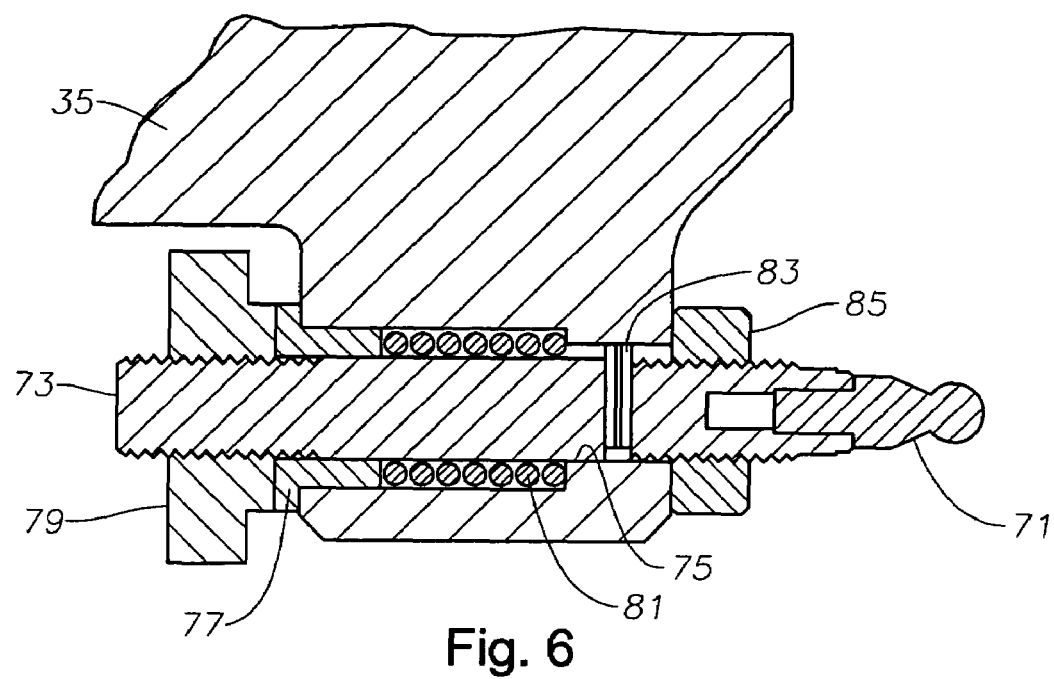
FIG. 6 is a sectional view of one of the contact probes of the gage taken along the line 6-6 of FIG. 1.

A probe or contact member 71 is mounted to the lower end of section 69 of arm 35. Contact member 71 is shown as a ball, but it would be a paddle if measuring threads. As shown in FIG. 6, contact member 71 has a threaded end that releasably secures to a threaded receptacle in a threaded rod 73, which is part of a vernier or fine adjustment assembly. Threaded rod 73 extends through a passage 75 in arm 35 and a bearing 77 located on the opposite end of passage 75. Bearing 77 has a collar that bears against one edge of arm 35. A knurled check nut 79 secures to the left end of threaded rod 73 for engaging bearing 77. A coil spring 81 biases threaded rod 73 and bearing 77 to the left, toward check nut 79. A transverse pin 83 engages a longitudinal groove extending through passage 75 to prevent rotation of threaded rod 73. A knurled nut 85 at the opposite end of threaded rod 73 from knurled nut 79 can be rotated to advance threaded rod 73 to the right or left along passage 75. After the desired position is reached, the user tightens check nut 79 to hold rod 73 in place.

Referring to FIG. 1, arm 37 also has a probe or contact member 87 that is shown as a ball, but it could be a paddle or other configuration. Contact member 87 forms the probe end of a conventional dial indicator 89. Dial indicator 89 will display the amount of movement of contact member 87 when contacting a workpiece to detect the amount of difference from a preset amount.

Figure 2:
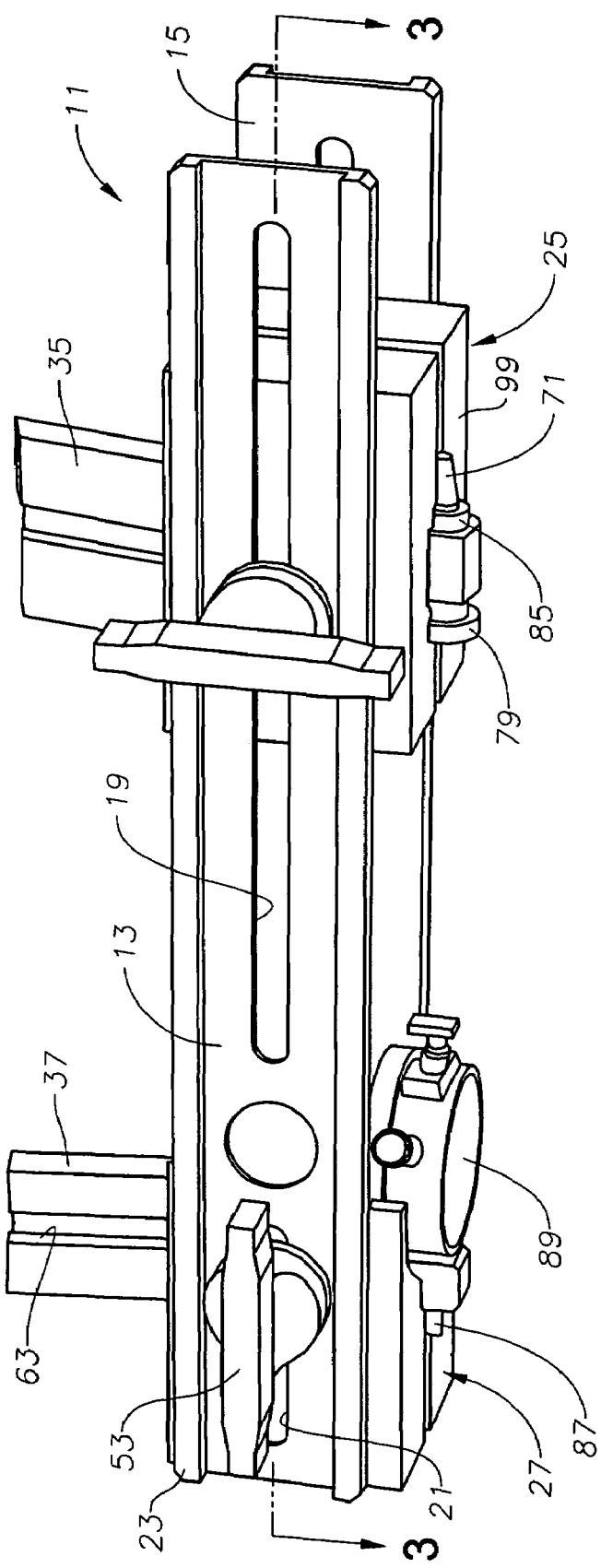
FIG. 2 is a perspective of a portion of the gage of FIG. 1, with the probes arranged for measuring an inner diameter very near the end of a workpiece.

Referring still to FIG. 1, each block 30 of second block set 27 has a large recess 91 formed on its inner side. Recesses 91 mate with each other to provide a cavity or clearance for dial indicator 89 when the user desires to position contact points 87 very close to the bottom or reference plane 99 of block sets 27. FIG. 2 shows dial indicator 89 in a recessed position. Referring to FIG. 5, blocks 29 of first block set 25 also have recesses 93 formed on their lower side (FIG. 1). Recesses 93 provide a clearance for knurled nuts 79, 85 when contact 71 is positioned close to the bottom or reference plane 99.

In operation, the user will need to set contact members 71 and 87 a selected distance apart. The user will also need to set contact members 71 and 87 a selected distance from the reference plane 99 of block set 25, 27. The user makes these adjustments by either using precision gage blocks or a setting standard. The user loosens knobs 53 and slides arms 35, 37 relative to block sets 25, 27 until contact members 71, 87 are the desired distance from reference plane 99. The drag brakes formed by coil springs 45 and friction pads or discs 47 prevent arms 35, 37 from sliding due to their own weight. For setting the width or distance between contact points 71, 87, often it is not necessary to slide both block sets 25, 27. Block set 27 might remain in the position previously used. If so, the user slides block set 25 along side rails 13, 15 to the desired distance from block set 27, then tightens its knob 53. For the fine adjustment to the precise distance between contacts 71, 87, the operator adjusts the vernier by loosening knurled nut 79 and rotating knurled nut 85 in the desired direction. Once in place, knurled nut 79 is tightened.

For measuring an outer diameter portion of a workpiece, arms 35, 37 will be positioned as shown in FIG. 1 with contact member 71, 87 facing each other at a specified distance apart and positioned at the proper distance from the reference planes 99. The user places contact members 71, 87 on opposite sides of the work piece. Dial indicator 89 displays the difference between the specified dimension and the actual measurement.

For measuring an inner diameter, the user loosens knobs 53 to allow the side rails to move away from the block sets 25, 27 until they disengage from the rail slots in the blocks and then rotates block sets 25, 27 about the axes formed by the locking rods 49 shown in FIG. 3. This rotation results in the reference planes 99 and contact members 71, 87 facing in opposite directions and in proper position for measuring an inside diameter. FIG. 2 shows gage 11 in position for measuring an inner diameter of a work piece, and particularly at a point very close to the rim of the work piece.

The invention has significant advantages. Only two knobs need to be loosened and tightened to reset the gage. The drag brakes prevent the components from sliding of their own weight while the knobs are loosened. This allows the reach of the arms and the distance between probes to be accurately and easily set and locked in place by the user. The gage can be quickly converted from an inner diameter measuring configuration to an outer diameter measuring configuration. The amount of time required to set the gage is much less than prior designs. The minimal use of threaded members that must be loosened and tightened results in a very rigid and accurate gage. The thermal layers avoid warmth from the technician's hands entering the metal of the gage, which could result in erroneous reading. The vernier adjustment provides very fine final adjustments. The recesses in the blocks allow the gage to be utilized for measuring diameters very close to the end of the work piece eliminating the need of special gages for this purpose. The rectangular side rails and arms provide more rigidity than cylindrical bars as often used in the prior art.

While the invention has been shown in only one of its forms, it should be apparent to those skilled in the art that it is not so limited but is susceptible to various changes without departing from the scope of the invention.

I claim:

1. A gage for measuring a diameter of a work piece, comprising:
    side rails;
    first and second block sets, each of the block sets having two juxtaposed blocks, each block set being carried between the side rails, the first block set being selectively slidable along the side rails toward and away from the second block set;
    first and second arms for supporting measuring probes, the arms extending transverse to the side rails between the blocks of the first and second block sets, respectively, each of the arms being selectively slidable in a direction parallel to its length; and
    a pair of releasable fasteners, each of the fasteners extending through a hole in each of the side rails, a hole in one of the block sets, and a hole in one of the arms, to preclude movement of the arms and the block sets with one fastening movement of each of the fasteners.

2. The gage according to claim 1, further comprising a drag brake mounted to each of the block sets, the drag brakes biasing the juxtaposed blocks toward each other to retard movement of the arms when the fasteners are loosened.

3. The gage according to claim 1, further comprising a drag brake mounted to the first block set that biases the juxtaposed blocks of the first block set toward each other and reacts against the side rails, so that when the fasteners are loosened, the drag brake retards movement of the first block set relative to the side rails and retards movement of the first arm relative to the first block set.

4. The gage according to claim 1, wherein:
    each of the arms and each of the side rails has a maximum width that is greater than a maximum thickness, and wherein the width of each of the arms lies in a common plane and the width of each of the rails lies in a plane parallel to the common plane of the arms.

5. The gage according to claim 1, wherein:
    each of the block sets has a reference plane facing toward the measuring probes.

6. The gage according to claim 1, wherein:
    each of the juxtaposed blocks has dowel pin holes to receive dowel pins that maintain alignment of the juxtaposed blocks.

7. The gage according to claim 1, further comprising:
    a stabilizing member mounted to each of the block sets in contact with an edge of one of the arms, the stabilizing members biasing the arms against mating surfaces in the block sets.

8. The gage according to claim 1, further comprising:
    a probe on each of the arms for contact with opposite sides of the work piece; wherein the probe mounted to the first arm comprises a display indicator; and
    the first block set has a recess formed therein for receiving the display indicator when the first arm is moved to a close proximity measuring position.

9. The gage according to claim 1, further comprising:
    a probe on each of the arms for contact with opposite sides of the work piece; wherein one of the probes comprises:

a vernier assembly cooperatively engaged with said one of the probes for fine adjustment.

10. The gage according to claim 1, further comprising a layer of material of low thermal conductivity on at least a portion of each of the side rails to serve as a thermal barrier against operator contact.

11. A gage for measuring a diameter of a work piece, comprising:
   side rails
   first and second block sets, each of the block sets having two juxtaposed blocks, each block set being carried by the side rails, the first block set being selectively slidable along the side rails toward and away from the second block set;
   first and second arms for supporting measuring probes, the arms extending transverse to the side rails between the blocks of the first and second block sets, respectively, each of the arms being selectively slidable in a direction parallel to its length;
   a pair of releasable fasteners, each of the fasteners securing the blocks of one of the block sets tightly together and to the arms and the side rails; and
   wherein while supporting one of the arms, each of the block sets is rotatable 180 degrees around the axis of one the releasable fasteners from a first position to a second position.

12. A gage for measuring a diameter of a work piece, comprising:
   a pair of parallel, spaced apart side rails, defining a longitudinal axis, each of the side rails having first and second longitudinally spaced apart apertures;
   first and second block sets, each of the block sets having two juxtaposed blocks, each of the block sets having an arm profile and being carried between the side rails, each of the block sets having a hole therethrough that is perpendicular to the longitudinal axis and registers with one of the apertures in the side rails, the first block set being selectively slidable along the side rails toward and away from the second block set;
   a pair of arms, each of the arms extending transverse to the longitudinal axis in sliding engagement with the arm profile of one of the block sets, each of the arms being selectively slidable in a transverse direction to the longitudinal axis, each of the arms having an elongated slot extending along a length of each of the arms that registers with one of the holes in the block sets and one of the apertures in the side rails; and
   a pair of fasteners, each of the fasteners extending through one of the apertures, holes and slots, such that when tightened, the block sets and the arms are tightly clamped together between the side rails.

13. The gage according to claim 12, further comprising:
   a spring and a brake disc located in each hole in each of the blocks, each of the springs biasing one of the blocks against one of the arms, each of the springs reacting against one of the side rails thru a brake disc.

14. The gage according to claim 12, wherein while supporting one of the arms, each of the block sets is rotatable 180 degrees relative to the side rails about one of the fasteners.

15. The gage according to claim 12, wherein:
   each of the arms and each of the side rails has a front side and a side edge, the front side being wider than the side edge, and wherein the front sides of each of the arms are contained in a common plane and the front sides of the side rails are in planes that are parallel to the common plane of the arms.

16. The gage according to claim 12, further comprising:
   a probe on each of the arms for contact with opposite sides of the work piece; wherein the probe mounted to one of the arms comprises a display indicator; and
   the block set that supports said one of the arms has a recess formed therein for receiving the display indicator when said one of the arms is moved to a close proximity measuring position.

17. A gage for measuring a diameter of a work piece, comprising:
   a pair of side rails, defining a longitudinal axis;
   two longitudinally spaced apart block sets, each of the block sets having two juxtaposed blocks, each block set being carried between the side rails, at least one of the block sets being selectively slidable along the side rails toward and away from the other block set;
   a pair of arms, each of the arms extending transverse to the longitudinal axis between the blocks of one of the block sets, each of the arms being selectively slidable in a transverse direction to the longitudinal axis;
   a pair of fasteners, each of the fasteners extending through apertures provided in the side rails, the blocks, and the arms, such that when tightened, the blocks of each of the block sets are tightly clamped together between the side rails; and
   a drag brake mounted to each block set, each drag brake biasing the blocks of each block set toward each other and reacting against one of the side rails to retard sliding movement of the arms and sliding movement of the block sets when the fasteners are loosened.

18. The gage according to claim 17, wherein while supporting one of the arms, each of the block sets is rotatable 180 degrees about one of the fasteners relative to the side rails.

19. The gage according to claim 17, further comprising:
   a probe on each of the arms for contact with opposite sides of the work piece; wherein the probe mounted to one of the arms comprises a display indicator; and
   the block set that supports said one of the arms has a recess formed therein for receiving the display indicator when said one of the arms is moved to a close proximity measuring position.

20. The gage according to claim 17, wherein each of the drag brakes comprises:
   a coil spring located within a recess in one of the blocks, having one end bearing against an outward facing shoulder; and
   a friction disk in contact with the other end of the coil spring, the friction disk slidingly contacting one of the side rails.

* * * * *